United States Patent [19]

Schettler

[11] Patent Number: 6,008,633

[45] Date of Patent: Dec. 28, 1999

[54] HIGH-POWER GRID-COMPATIBLE CONVERTER-CONTROLLED, VOLTAGE-INJECTING PHASE-SHIFTING TRANSFORMER

[75] Inventor: Frank Schettler, Erlangen, Germany

[73] Assignee: Siemens Aktiengesellschaft, Munich, Germany

[21] Appl. No.: 09/050,659

[22] Filed: Mar. 30, 1998

Related U.S. Application Data

[63] Continuation of application No. PCT/DE96/01706, Sep. 11, 1996.

[30] Foreign Application Priority Data

Sep. 29, 1995 [DE] Germany .......................... 195 36 468

[51] Int. Cl.[6] .................................................. H01F 30/12
[52] U.S. Cl. .............................................................. 323/361
[58] Field of Search .................................. 323/356, 361; 363/39, 40, 95, 96, 135

[56] References Cited

U.S. PATENT DOCUMENTS

| | | | |
|---|---|---|---|
| 4,663,702 | 5/1987 | Tanaka ...................................... | 363/65 |
| 4,870,557 | 9/1989 | Stacey ....................................... | 363/43 |
| 5,010,277 | 4/1991 | Courier De Mere ............... | 315/200 R |
| 5,587,892 | 12/1996 | Barrett ..................................... | 363/44 |
| 5,673,189 | 9/1997 | Schettler . | |

FOREIGN PATENT DOCUMENTS

| | | |
|---|---|---|
| 30 42 848 C2 | 10/1981 | Germany . |
| 42 25 269 A1 | 2/1994 | Germany . |
| 43 23 290 A1 | 1/1995 | Germany . |
| 43 43 929 A1 | 6/1995 | Germany . |
| 2 293 928 | 4/1996 | United Kingdom . |

OTHER PUBLICATIONS

"Development of a large static VAR generator using self–commutated inverters for improving power system stability" (Mori et al.), IEEE Transactions on Power Systems, vol. 8, No. 1, Feb. 1993, pp. 371–377.

"Requirements on the control of a three–level four quadrant power converter in a traction application" (Bächle et al.), Proceedings of the European Conference on Power Electronics and Applications, vol. 2, Oct. 1989, pp. 577–582;

"A comparison of different circuit configurations for an advanced VAR compensator (ASVC)" (Wuest et al.), 23rd Annual IEEE Power Electronics Specialists Conference Toledo, Spain , vol. 1, 1992, pp. 521–529.

"Advanced static compensation using a multilevel GTO thyristor" (Menzies et al.), IEEE Transactions on Power Delivery, vol. 10, No. 2, Apr. 1995, pp. 732–738.

(List continued on next page.)

*Primary Examiner*—Matthew Nguyen
*Attorney, Agent, or Firm*—Herbert L. Lerner; Laurence A. Greenberg

[57] ABSTRACT

A high-power grid-compatible converter-controlled, voltage-injecting phase-shifting transformer, includes a converter, an energizer transformer connected the converter, and a booster transformer which has at least one phase connected to the converter. The converter has an excitation-side power converter with at least one phase intercoupled by a DC intermediate circuit to an output-side power converter with at least one phase. Each of the excitation-side power converter and the output-side power converter have turnoff power semiconductors. Each phase of the excitation-side power converter has n double cascades electrically connected in series. Each of the double cascades have a capacitive energy store with a terminal and two switching devices which include the turnoff power semiconductors connected electrically in parallel with the capacitive energy store. Each phase of the output-side power converter has n four-quadrant controllers with AC voltage terminals and DC voltage terminals. The booster transformer has n two-winding transformers per phase, a secondary side and a primary side. The n two-winding transformers are connected electrically in series on the secondary side and coupled in each case on the primary side to the AC voltage terminals of the four-quadrant controllers. The DC voltage terminals of each of the four-quadrant controllers are connected to the terminal of the capacitive energy store of a corresponding one of the double cascades.

8 Claims, 4 Drawing Sheets

OTHER PUBLICATIONS

"The unified power flow controller: a new approach to power transmission control" (Guygyi et al.), IEEE Transactions on Power Delivery, vol. 10, No. 2, Apr. 1995, pp. 1085–1097.

"Static voltage system converter Muldenstein" (Fieber), EB Elektrische Bahnen, vol. 93, No. 1, Jan. 1995, pp. 43–48.

German Gebrauchsmuster Application No. G 94 16 048.1 (Schettler), filed Oct. 6, 1994, device for increasing the amount of power of the base oscillation of a self–guided inverter.

PRIOR ART

FIG 1

PRIOR ART

HIGH-POWER GRID-COMPATIBLE CONVERTER-CONTROLLED, VOLTAGE-INJECTING PHASE-SHIFTING TRANSFORMER

CROSS-REFERENCE TO RELATED APPLICATION

This application is a continuation of International Application Ser. No. PCT/DE96/01706, filed Sep. 11, 1996, which designated the United States.

BACKGROUND OF THE INVENTION

FIELD OF THE INVENTION

The invention relates to a high-power grid-compatible converter-controlled, voltage-injecting phase-shifting transformer. The transformer includes a converter having an input side and an output side, an energizer transformer connected to the input side of said converter, and a booster transformer having at least one phase connected to the output side of said converter. The converter has an excitation-side power converter with at least one phase intercoupled by a DC intermediate circuit to an output-side power converter with at least one phase. Each of the excitation-side power converter and the output-side power converter has turnoff power semiconductors.

Because of pronounced intermeshing of the high-voltage grids, it is necessary to be able to control the power flow and its direction at will or as required on selected transmission lines. As a rule, use is made for this purpose of so-called phase-shifting transformer arrangements. They generally are formed of a three-phase energizer transformer and a three-phase booster transformer. The input winding of the energizer transformer draws electric power from the grid. The output winding is usually provided with a step switch. The winding supplies the electric power to the input winding of the booster transformer, whose output winding is connected in series to the transmission line and through which the entire line current flows. As a result, there is produced in the booster transformer an additional voltage whose absolute magnitude depends on the position of the step switch. Its phase angle is determined by the vector groups of the energizer transformer and booster transformer. The voltage across the output winding of the booster transformer is termed a phase-shifted voltage.

The functional principle of a power-flow controller is now described. A controllable voltage source is inserted in series into a transmission line. The power flow through the transmission line is influenced by specifically varying the absolute value and the phase angle of the series voltage. The phase angle of the series voltage relative to the current flowing in the line produces the effective power and the reactive power, which the voltage source exchanges with a grid. The effective power can either be fed to large energy stores or be drawn. If it is drawn, it is usually drawn from the grid and fed to the grid again via a second voltage source having a different voltage and connected in parallel with the grid. The use of a parallel voltage source is advantageous, since in addition to the effective power required in conjunction with the series connection, it is also possible to exchange reactive power with the grid. The reactive power exchange of the parallel connection is independent of that of the series connection.

The power-flux controllers can be constructed using voltage inverters. The power-flux controllers usually include as main components: a first transformer in a quadrature-axis branch, also denoted as an energizer transformer; a first inverter in the quadrature-axis branch, also termed an excitation-side power converter; a capacitive energy store; a second inverter in a direct-axis branch, also denoted as an output-side power converter; and a second transformer in the direct-axis branch, also denoted as a booster transformer.

The first and second inverters invert the DC voltage of the capacitive energy store into a stepped AC voltage. The AC voltage is matched via the transformation ratios of the energizer and booster transformers and to the grid voltages provided. Such a circuit is denoted as a Unified Power Flow Controller (UPFC). The article "The Unified Power Flow Controller: A New Approach to Power Transmission Control", published in IEEE Transactions on Power Delivery, Vol. 10, No. 2, April 1995, pages 1085 to 1093 discloses a UPFC circuit. The circuit includes an excitation-side inverter which is connected in parallel with the grid via an energizer transformer, an output-side inverter which is connected in series with the grid via a booster transformer, and a capacitor via which the two inverters are connected to one another on their DC voltage sides. As FIG. 1 of this article shows, each of the two power converters is configured as a 6-pulse three-phase bridge circuit with six turn-off power semiconductors, in particular gate turn-off (GTO) thyristor, a freewheeling diode being connected in anti-parallel to each GTO thyristor. In the discussions, the circuit is to be denoted as a two-point circuit, because it is possible by driving the GTO thyristors for the positive or the negative terminal of the energy store to be connected to the terminal of one phase of the three-phase system.

The achievable power of the two-point circuit is determined by the voltage endurance and the turn-off current of the GTO thyristor used. This holds when the GTO thyristor is sufficiently cooled. It may be assumed that this is presently capable of being implemented.

Since the invention relates to a power-flow controller of high power, the known options which can be used to increase the power of the overall system are set forth below. According to the prior art, two approaches may be adopted to provide a solution in this case. One approach leads via increasing the power of an inverter, the other approach utilizes the interconnection of a plurality of inverters.

If the required power of the UPFC circuits is higher than achievable with a GTO thyristor, a direct series connection of the GTO thyristor can be used. The higher power is achieved in this case by a higher voltage across the capacitive energy store.

The direct series connection has numerous advantages. First, the power of the two-point circuit can be raised in fine steps. Second, redundancy can be achieved by inserting additional GTO thyristors into the series connection.

On the other hand, the direct series connection of GTO thyristors has some disadvantages. For instance, when driving the GTO thyristors, it has to be ensured that all GTO thyristors connected in series switch exactly simultaneously, so that erroneous voltage distributions are avoided between the series-connected GTO thyristors. The coarse stair-step shape of the AC voltage of the power converter is not improved by an increase in the power. Generally, these circuits therefore cannot be used without additional filters for reducing the distortions in the grid voltage. The known damping circuits for the GTO thyristors in a direct series connection have substantially higher losses than those which can be used for individual GTO thyristors. The voltage utilization of the GTO thyristors drops with increasing number of series connections. This leads to a disproportionate increase in the number of series connections by comparison with the increase in the capacitor voltage, and this entails higher procurement costs and specific losses and thus higher operating costs for the circuit. To date, no number of series connections in excess of six has become known, and therefore the maximum achievable power of an inverter unit must be regarded as limited.

Figure 4:
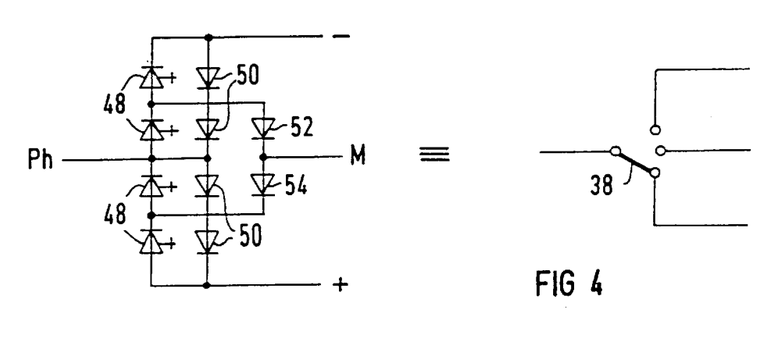
FIG. 4 is a circuit diagram of a switching device of the phase-shifting transformer according to FIG. 3.

A further approach to increasing the power of an inverter is the indirect series connection of two GTO thyristors in the three-point circuit. In this circuit, the terminal of the phase of the three-phase transformer can be connected to the positive, negative or center terminal of the energy store. An example for the use of such a circuit is described in the article "Statischer Umrichter Muldenstein", ("Muldenstein Static Converter"), published in the German journal "eb-Elektrische Bahnen", Volume 93 (1995), Issue 1/2, pages 43 to 48. FIG. 4 of the article shows a four-quadrant controller in which two three-point phase modules are used. The extension of the three-point circuit to form an n-point circuit is described in the article entitled "Advanced Static Compensation Using a Multi-Level GTO Thyristor Inverter", IEEE 94 SM 396-2 PWRD, pages 1 to 7. The article sets forth advantages of the n-point circuit. First, the voltage of the inverter can be increased without a direct series connection of GTO thyristors, thus circumventing the need to switch the GTO thyristors exactly simultaneously. Second, the time-offset connection of the individual voltage stages permits a better approximation of the stepped AC voltage to the sinusoidal shape and thus a smaller proportion of higher harmonics in the output current. As a result, the GTO thyristors used can be better utilized and the fundamental power of the inverter can be increased. Third, it is possible using the n-point circuit for the power to be increased without additional inductive components (transformers or three-phase balance coils). Inductive components are more expensive to procure and have higher losses than comparable capacitive components. Fourth, the n-point circuit can be connected to the grid via a standard transformer. Fifth, the stepped AC voltage can be approximated to the sinusoidal shape without departing from the fundamental frequency modulation of the GTO thyristor drive. Fundamental frequency modulation means that each GTO thyristor is turned on or off only once per period. A higher-frequency GTO thyristor drive (pulse width modulation) is limited in practice to frequencies of up to 250 Hz because of the turn-off times and hold-off intervals of the components. Although this does permit a reduction in the low harmonics (mode numbers 5 to 17), it leads to an increase in the next higher harmonics (from 19th). This can entail an additional outlay on filters. A further important disadvantage of a higher-frequency GTO thyristor drive are the switching losses in the inverter, which rise in proportion to the switching rate.

The concept of the n-point circuit also has disadvantages. First, different requisite inverter powers require different numbers of points and, consequently, different structural configurations of an n-point phase module. Second, starting from n>3, a higher voltage endurance is required in part than in the case of the diodes which lead to the intermediate terminals of the energy store. Third, the individual n−1 capacitor voltages must be controlled to the same level. This is difficult to achieve from a practical viewpoint. Fourth, a complicated drive logic of the GTO thyristors is required in order to exclude forbidden circuit states. A forbidden circuit state is understood to be the case where more than n−1 GTO thyristors arranged in series are turned on simultaneously.

It may be assumed that these disadvantages have so far prevented the implementation of numbers of points of n>3.

Inverter systems which achieve a higher total power can be produced by interconnecting a plurality of inverters. Apart from increasing the power, the aim in this case is also to reduce the voltage distortions and to achieve a sinusoidal current.

Various possibilities for interconnecting inverters are known from the article entitled "A Comparison of Different Circuit Configurations for an Advanced Static Var Compensator (ASVC)", published in "PESC'92 Record", 23rd Annual IEEE Power Electronics Specialists Conference Toledo, Spain, 1992, pages 521 to 529. Either a two-point or a three-point inverter is used as inverter in the article. The GTO thyristors are controlled by fundamental frequency modulation, which results in each GTO thyristor being turned on and off only once per period.

Various possibilities for interconnecting two power converters are represented in FIG. 8 on page 524 of the article. As shown by the comparison of these alternatives carried out in the article, the highest fundamental power can be achieved with the circuit variants n and o. In these variants, use is made of two three-point circuits each, which are connected in series on the three-phase side via the primary windings of the transformers. The two transformers are configured in different vector groups (Yy and Yd), the result being a 12-pulse grid perturbation. As a result of the series connection of the inverters on the three-phase side, the inverter current contains no harmonics of mode numbers 5, 7, 17, 19 etc. The GTO thyristors used can thereby be utilized more effectively. The difference between the two variants n and o consists in the wiring of the DC voltage side, and this exerts no essential influence on the achievable power.

An SVG (Static Var Compensator) with a power of 80 MVA is known from the publication entitled "Development of a Large Static Var Generator Using Self-Commutated Inverters for Improving Power System Stability", printed in IEEE Transactions on Power Systems, Vol. 8, No. 1, February 1993, pages 371 to 377. In the case of this system, high power is achieved by using a series connection of six GTO thyristors per valve and a series connection of eight inverters via a special multi-winding transformer. As in the case of the variants n and o of the previously cited article, the increase in the fundamental power is achieved by turning the individual secondary windings of the transformer. The eight secondary windings of the transformer are turned relative to one another by 7.5° el., and this leads to a 48-pulse grid perturbation.

In general, the advantages of increasing the power by series connections on the three-phase side are numerous. First, with the increase in the power, the grid distortions can be reduced by suitable transformer circuits. Second, the phase current of each individual inverter can be rendered more sinusoidal by the series connection, on the three-phase side, of the inverters via transformers, and the switching power of the GTO thyristor used can be utilized more efficiently thereby.

On the other hand, the circuit has disadvantages. First, the power can be stepped only coarsely by adding and omitting complete inverters. In the case of a direct series connection of GTO thyristors, a finer stepping can be performed by the number of GTO thyristors. Second, there is a need for highly specialized and therefore expensive transformers (special manufacture). Third, when a connection is made to the high-voltage grid, there is a need for an additional transformer in order to transform the supply voltage to an intermediate voltage for which the special transformer can be designed on the primary side. Fourth, the transformers are attended by relatively high operating losses.

German Utility Model Application G 94 16 048.1 discloses a static compensator (GTO-SVC) in which the power is increased by cascading power converter modules. A three-point phase module is used in this case as a power converter module, it is also possible to use two-point or, in general, n-point modules. A plurality of capacitors can be turned on or turned off in one phase one after another owing to the cascaded arrangement of the phase modules. The selection of the turn-on and turn-off instants can be made in such a way that the output voltage of the cascade inverter is approximated as well as possible to the sinusoidal shape. As a result, the proportion of higher harmonics in the current is reduced, and the utilization of the GTO thyristors is thus increased.

The advantages of this solution are numerous. First, the advantages of the n-point circuit come fully to bear. Second, the power is increased by multiple use of the same inverter module and the special development of different modules for different numbers of points is eliminated. Third, the individual capacitor voltages can be controlled independently of one another. Fourth, each inverter module represents a self-sufficient unit. No additional, prohibited circuit states can occur.

On the other hand, there are disadvantages. First, the separation of the three phases in conjunction with the cascading produces a higher outlay on capacitors. Second, the power can be stepped by adding or omitting individual cascades. Finer stepping can be achieved by the number of GTO thyristors in the case of direct series connection of GTO thyristors.

SUMMARY OF THE INVENTION

It is accordingly an object of the invention to provide a high-power grid-compatible converter-controlled, voltage-injecting phase-shifting transformer, which overcomes the above-mentioned disadvantages of the prior art devices and methods of this general type, and whose total power can be matched in steps to the respective requirements in a cost effective manner.

With the foregoing and other objects in view there is provided, in accordance with the invention, a high-power grid-compatible converter-controlled, voltage-injecting phase-shifting transformer, comprising: a converter which has an input side and an output side; an energizer transformer connected to the input side of the converter; a booster transformer which has at least one phase connected to the output side of the converter; the converter has an excitation-side power converter with at least one phase intercoupled by a DC intermediate circuit to an output-side power converter with at least one phase, each of the excitation-side power converter and the output-side power converter have turnoff power semiconductors; each phase of the at least one phase of the excitation-side power converter has n double cascades electrically connected in series, each of the double cascades have a capacitive energy store with a terminal and two switching devices which include the turnoff power semiconductors connected electrically in parallel with the capacitive energy store; each phase of the at least one phase of the output-side power converter has n four-quadrant controllers with AC voltage terminals and DC voltage terminals; and the booster transformer has n two-winding transformers per each phase of the at least one phase, a secondary side and a primary side, the n two-winding transformers connected electrically in series on the secondary side and coupled in each case on the primary side to the AC voltage terminals of the four-quadrant controllers, and the DC voltage terminals of each of the four-quadrant controllers connected to the terminal of the capacitive energy store of a corresponding one of the double cascades.

In accordance with an added feature of the invention, each of the four-quadrant controllers have capacitors, and the capacitors of each of the four-quadrant controllers and the capacitive energy store of the corresponding one of the double cascades form a sub-assembly.

In accordance with an additional feature of the invention, the n two-winding transformers of each phase of the at least one phase of the booster transformer are combined to form a transformer unit.

In accordance with another feature of the invention, the transformer unit is a three-winding transformer having a five-limb core.

In accordance with a further added feature of the invention, the switching devices are two-point modules.

In accordance with yet another feature of the invention, the switching devices are three-point modules.

In accordance with yet another additional feature of the invention, the switching devices are n-point modules.

In accordance with a concomitant feature of the invention, the capacitive energy store has at least one capacitor and the switching devices have points, and the number of the points determines the number of the at least one capacitor.

The fact that each phase of the excitation-side power converter of the phase-shifting transformer is constructed from a plurality of double cascades and each phase of its output-side power converter is constructed from a plurality of four-quadrant controllers, the booster transformer likewise being constructed per phase from a plurality of two-winding transformers, produces a high-power grid-compatible converter-controlled, voltage-injecting phase-shifting transformer whose total power can be matched to the respective requirements. A modular system is created with the aid of which the total power of the phase-shifting transformer, also called a power-flow controller, can be matched in steps to the respective requirements without this necessitating special construction of the components. A cost effective implementation of the system is thereby possible by multiple use of the same units.

In addition to the above-mentioned economic advantages, the embodiment of the phase-shifting transformer for controlling the flow of power also has favorable technical characteristics by comparison with concepts known to date.

Other features which are considered as characteristic for the invention are set forth in the appended claims.

Although the invention is illustrated and described herein as embodied in a high-power grid-compatible converter-controlled, voltage-injecting phase-shifting transformer, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
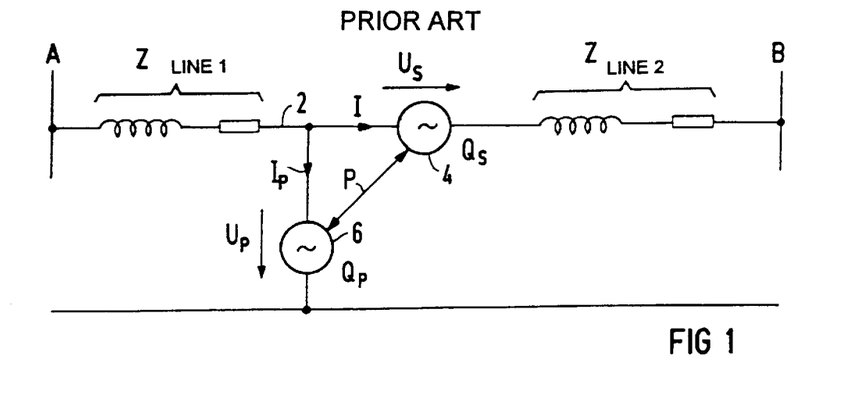
FIG. 1 is a diagrammatic circuit schematic of a functional principle of a power-flow controller as known in the prior art.

Referring now to the figures of the drawing in detail and first, particularly, to FIG. 1 thereof, there is shown the functional principle of a power-flow controller as known in the prior art. A controllable voltage source 4 is inserted in series into a transmission line 2. The power flow through the transmission line 2 is influenced by specifically varying the absolute value and the phase angle of the series voltage $U_s$. The phase angle of the series voltage $U_s$ relative to the current I flowing in the line 2 produces the effective power P and the reactive power $Q_s$, which the voltage source 4 exchanges with a grid. The effective power P can either be fed to large energy stores or be drawn or, as shown in FIG. 1, it is drawn from the grid and fed to the grid again via a second voltage source 6 having the voltage $U_p$ and connected in parallel with the grid. The use of a parallel voltage source 6 is advantageous, since in addition to the effective power P required in conjunction with the series connection, it is also possible to exchange reactive power $Q_p$ with the grid. The reactive power exchange $Q_p$ of the parallel connection is independent of that of the series connection.

Figure 2:
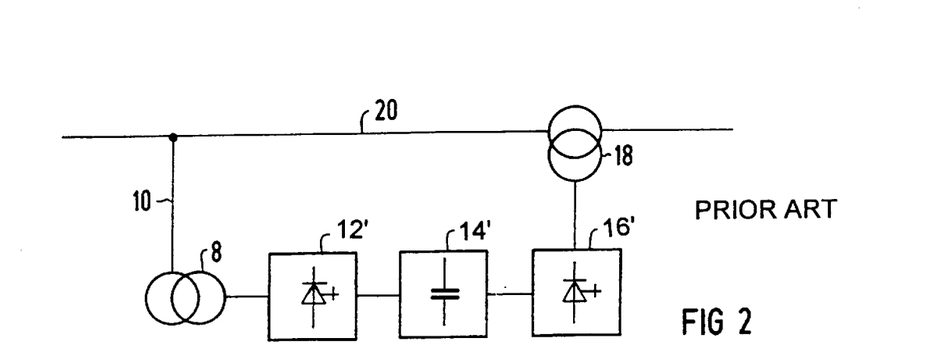
FIG. 2 is a circuit diagram of a converter-controlled, voltage-injecting phase-shifting transformer as known in the prior art.

The power-flux controllers which operate according to the principle described can be constructed using voltage inverters. As shown in FIG. 2, they have the following main components: a transformer 8 in the quadrature-axis branch 10, also denoted as an energizer transformer; an inverter 12' in the quadrature-axis branch 10, also termed an excitation-side power converter; a capacitive energy store 14'; an inverter 16' in the direct-axis branch 20, also denoted as an output-side power converter; and a transformer 18 in the direct-axis branch 20, also denoted as a booster transformer.

The two inverters 12' and 16' invert the DC voltage of the capacitive energy store 14' into a stepped AC voltage. The AC voltage is matched via the transformation ratios of the transformers 8 and 18 to the grid voltages provided.

Figure 3:
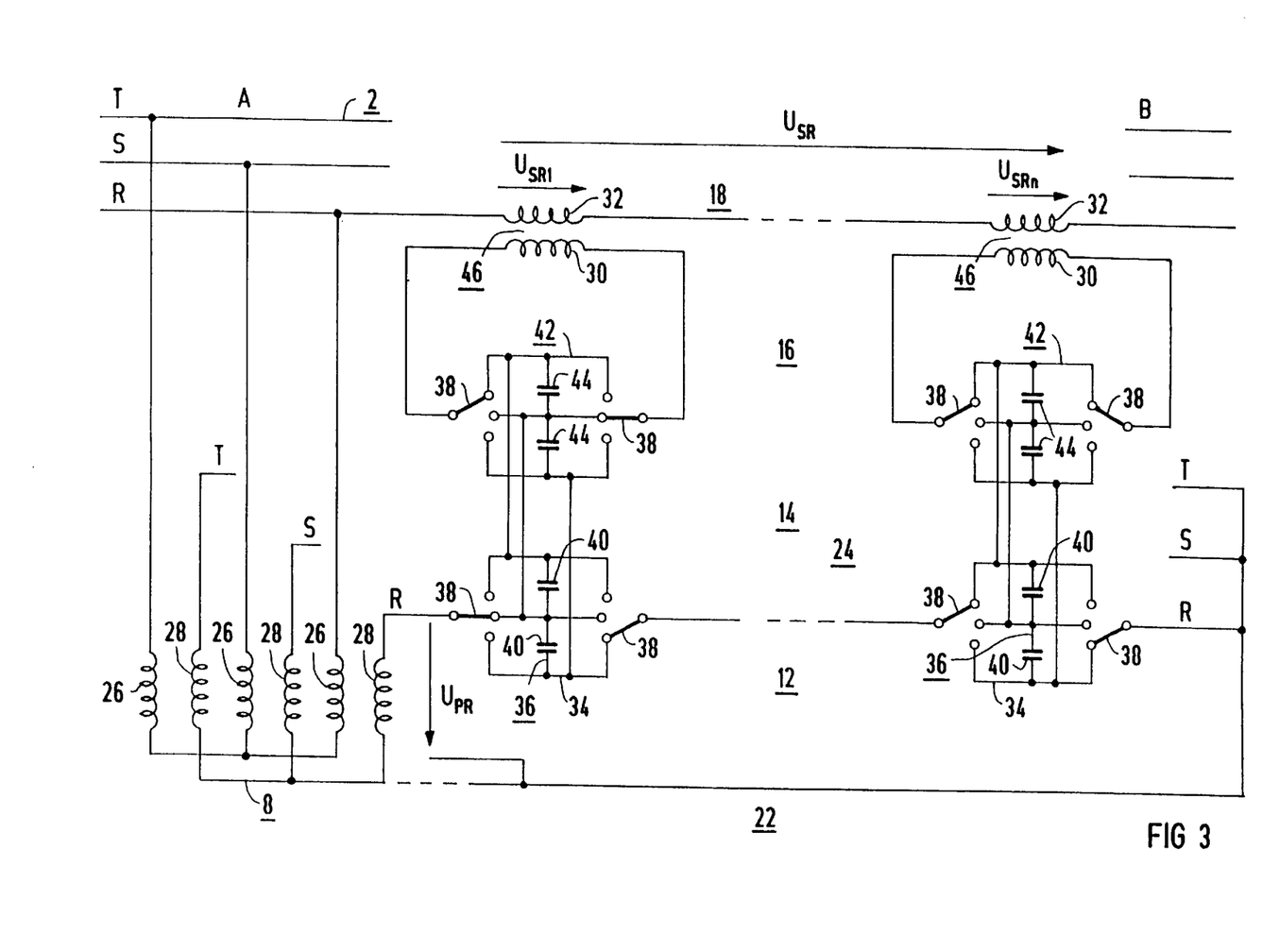
FIG. 3 is a circuit diagram of a first embodiment of the phase-shifting transformer according to the invention.

FIG. 3 shows an outline circuit diagram of a high-power converter-controlled, voltage-injecting phase-shifting transformer 22 according to the invention, which is used to control the flow of power. For the sake of clarity, only one phase R of the phase-shifting transformer 22 is represented in detail. The converter-controlled, voltage-injecting phase-shifting transformer 22 is connected in an electrically conducting fashion to the lines R, S and T of an electric transmission line 2. A grid is connected to an exciter node A, and another grid is connected to a connecting node B. The converter-controlled, voltage-injecting phase-shifting transformer 22 is provided for the purpose of controlling the flow of power between the two grids. The phase-shifting transformer 22 essentially is formed of an energizer transformer 8, a converter 24 and a booster transformer 18. The converter 24 has an excitation-side and an output-side power converter 12 and 16 which are electrically intercoupled by a DC intermediate circuit 14. The power converters 12 and 16 are self-commutated power converters which in each case have turn-off power semiconductor switches as power converter valves. The input windings 26 of the energizer transformer 8 are connected to the lines R, S and T at the excitation node A and exchange electric power with the grid connected to the excitation node A. The output winding 28 of this energizer transformer 8 is usually connected to the AC voltage terminals of the power converter 12 of the converter 24. The input windings 30 of the booster transformer 18 are coupled to the AC voltage terminals of the power converter 16, the output windings 32 thereof being disposed in each case in series in the lines R, S and T.

Each phase R, S and T of the excitation-side power converter 12 of the converter 24 of the phase-shifting transformer 22 has n double cascades 34, which are connected electrically in series and in each case include a capacitive energy store 36 and two switching devices 38 which are connected electrically in parallel with the energy store 36. Two capacitors 40 connected electrically in series are provided as the capacitive energy store 36. The number of the capacitors depends on the number of points of the switching device 38, n–1 capacitors 40 being required for the capacitive energy store 36 in the case of an n-point switching device 38. Each phase R, S and T of the output-side power converter 16 has n four-quadrant controllers 42, each four-quadrant controller 42 has two capacitors 44 connected electrically in series and two three-point switching devices 38 which are connected electrically in parallel with the series connection of the capacitors 44. The structure of such a four-quadrant controller 42 is known from the article "Statischer Umrichter Muldenstein" ("Muldenstein Static Converter") mentioned at the beginning. The booster transformer 18 is constructed from n two-winding transformers 46 per phase R, S, T, the n output windings 32 of one phase being arranged in each case in series in the lines R, S, and T of the of the grid. The n input windings 30 of one phase are coupled in each case to the AC voltage terminals of the n four-quadrant controllers 42 of the same phase of the output-side power converter 16. The capacitors 40 and 44 form the capacitive energy store of the converter 24, in which the capacitors 40 and 44 are connected electrically in parallel.

Figure 5:
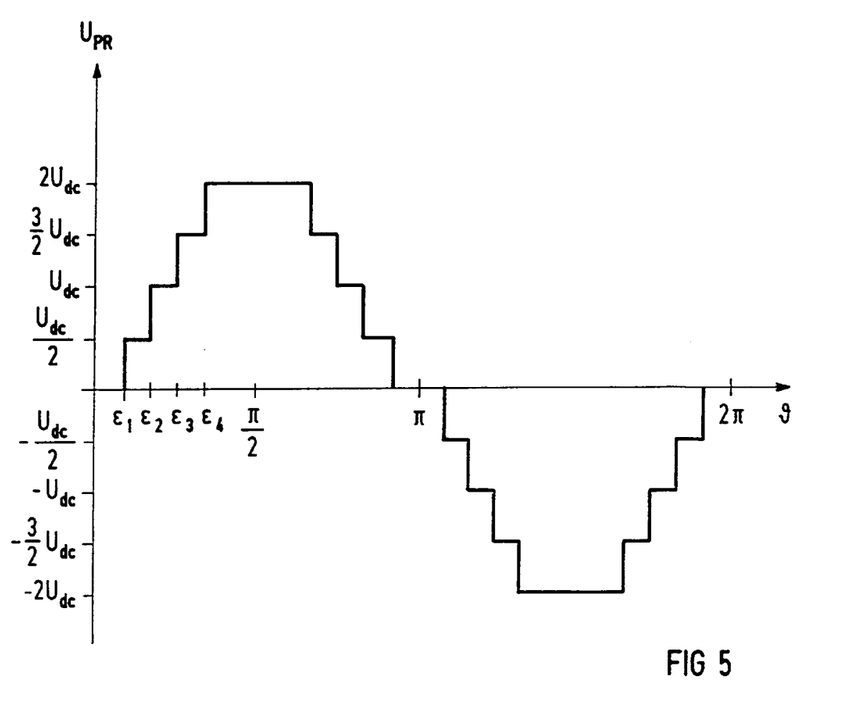
FIG. 5 is a graph showing a characteristic of an injecting phase-shifted voltage of the phase-shifting transformer in a diagram plotted against the angle J.

The parallel voltage UPR is formed by successively connecting the capacitors 40 into and out of the current path of the individual phases. The switching in and out is performed by means of the three-point switching devices 38. A 4n+1-stepped voltage $U_{PR}$ results. The instants for switching the capacitors 40 in and out can be selected such that the stair-step shaped output voltage $U_{PR}$ of the cascade power converter 12 corresponds as well as possible to the sinusoidal shape. FIG. 5 shows a possible characteristic of the output voltage $U_{PR}$ when two double cascades 34 are present and all the voltages of the capacitors 40 are charged to the same voltage $U_{dC}/2$.

The phase-shifted voltage $U_{SR}$ is composed of the n partial voltages $U_{SR1}, \ldots, U_{SRn}$ which are formed by n four-quadrant controllers 42 from the DC voltage of n×2 capacitors 44. The n partial voltages $U_{SR1}, \ldots, U_{SRn}$ are injected via n two-winding transformers 46 per phase R, S, T in the transmission line 2. Voltage blocks of different widths can be produced by appropriately connecting the three-point switching devices 38, thus producing a phase-shifted voltage $U_{SR}$ with 4n+1 steps. A criterion for selecting the steps can be selected such that the phase-shifted voltage $U_{SR}$ is as sinusoidal as possible. An example for the shape of the phase-shifted voltage $U_{SR}$ is given by the voltage $U_{PR}$ shown in FIG. 5. The phase-shifted voltage $U_{SR}$, however, does not have to be equal to the parallel voltage $U_{PR}$.

Each of the four-quadrant controllers 42 is assigned to a double cascade 34 and connected thereto by the parallel connection of the capacitors 44 and 42. The parallel connection of the capacitors 44 and 42 ensures the transmission of the effective power between the parallel branch and the series branch of the power-flow controller. It should be ensured by driving the double cascade 34 and the four-quadrant controller 42 that the effective-power balance per capacitor 40 and 44 is equalized on average.

As already mentioned, in the embodiment in accordance with FIG. 3 the switching device 38 of each cascade 34 is of three-point configuration. The three-point switching device 38 can be a three-point module corresponding to FIG. 4 and includes a bridge branch with four turn-off power semiconductor switches 48, for example turn-off thyristors (GTO thyristors) with associated freewheeling diodes 50, which form a three-point valve branch with the aid of two centerpoint diodes 52 and 54. A capacitor 40 or 44 can be connected in each case to the terminals+, M and M, −. The phase R or S or T is connected to the terminal Ph. The structure of such a three-point valve branch is identical to a bridge branch of a three-point inverter. It is possible by driving the turn-off power semiconductor switches 48 for one of the two capacitors 40 respectively to be connected into the current path of a phase R, S and T in such a way as to produce a parallel voltage $U_{PR}$ in accordance with FIG. 5.

Instead of the three-point modules, it is also possible to use two-point or n-point modules. The power of each module can be increased in fine steps by the direct series connection of turn-off power semiconductor switches. In this case, redundant turn-off power semiconductor switches can be built in, and t his would lead to an increase in the reliability of the power converters 12 and 16.

Figure 6:
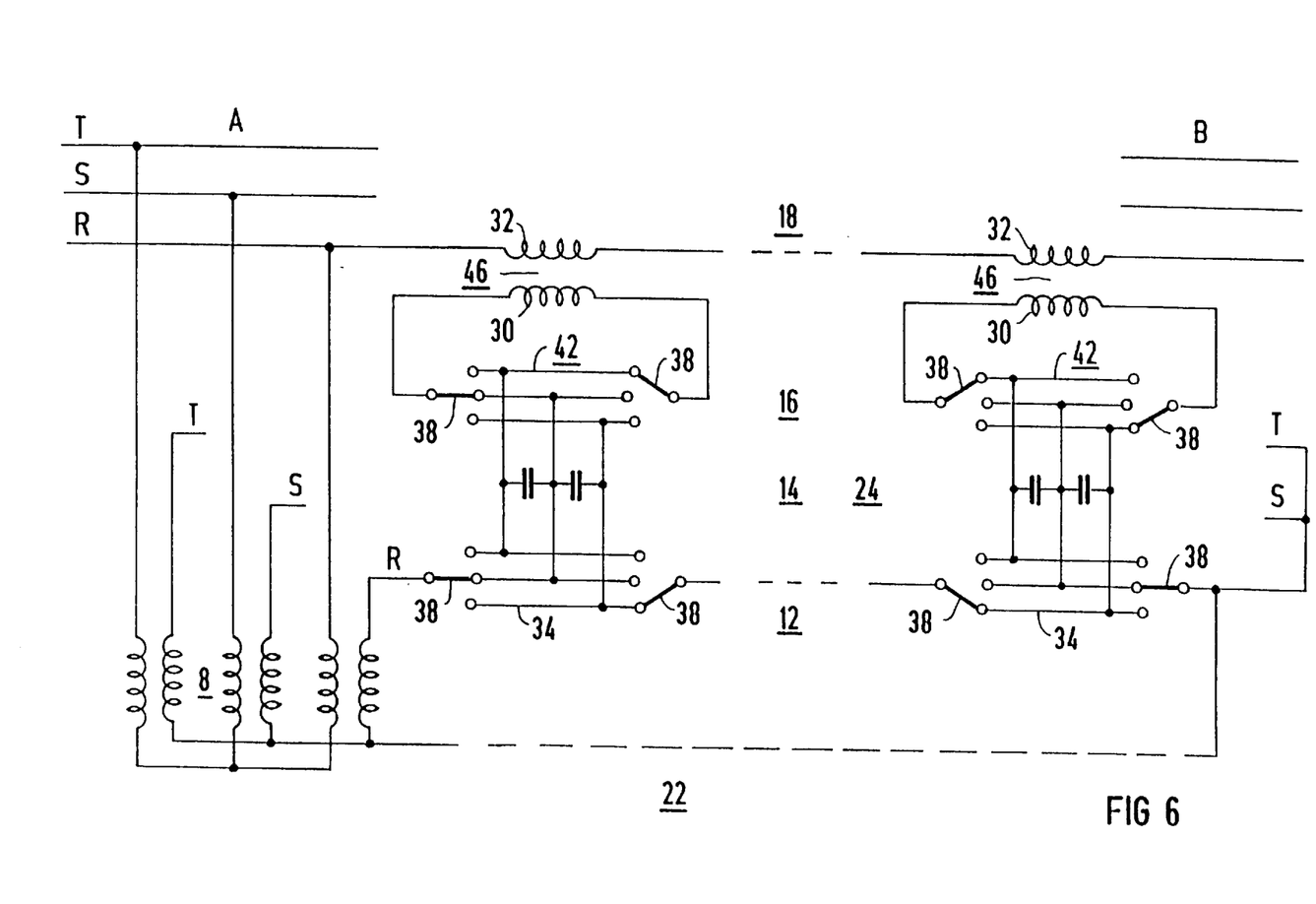
FIG. 6 is a circuit diagram of an advantageous embodiment of the phase-shifting transformer.

FIG. 6 shows an advantageous embodiment of the phase-shifting transformer 22 according to the invention. The difference by comparison with the embodiment in accordance with FIG. 3 consists in that the capacitors 44 of each four-quadrant controller 42 an d of the capacitive store 36 of each double cascade 34 form a sub-assembly. Consequently, there is a reduction in the number of capacitors and in their wiring to a four-quadrant controller 42 and a double cascade 34.

The two terminals of the output winding of the two-winding transformers 46, which are connected electrically in series, and the two terminals of the input windings 30 must be capable of being subjected to the same load current. An advantageous embodiment of the power-flow controller is produced by using conventional single-phase transformers in the direct-access branch 20. Further advantages may be achieved when the n two-winding transformers 46 of one phase R or S or T are combined to the greatest possible extent. For example, it is possible in the case of a phase-shifting transformer according to the invention and having three double cascades 34 and assigned four-quadrant controllers 42 to use a three-winding transformer with a five-limb core per phase R or S or T.

The advantages of the phase-shifting transformer according to the invention are numerous. First, the cascade circuit can be fully used in the quadrature-axis branch 10. Second, the phase-shifted voltage $U_{SR}$ is likewise formed from a plurality of voltage steps, and this permits a good approximation to the sinusoidal shape. The result is a high utilization of the turn-off power semiconductor switches employed, and a favorable mode of operation with regard to the distortion currents. Third, in the proposed solution of the phase-shifting transformer according to the invention, the amplitude of the phase-shifted voltage $U_{SR}$ can be changed quickly by means of the width of the voltage blocks of the partial voltages while maintaining the fundamental frequency modulation of the GTO thyristor drive. Fourth, the power of this phase-shifting transformer can be matched economically to the requirements by multiple use of the same components. Standardized modules can be used for the individual components. This leads to a cost effective configuration.

I claim:

1. A high-power grid-compatible converter-controlled, voltage-injecting phase-shifting transformer, comprising:

a converter having an input side and an output side;

an energizer transformer connected to said input side of said converter;

a booster transformer having at least one phase connected to said output side of said converter;

said converter having an excitation-side power converter with at least one phase intercoupled by a DC intermediate circuit to an output-side power converter with at least one phase, each of said excitation-side power converter and said output-side power converter having turnoff power semiconductors;

each phase of said at least one phase of said excitation-side power converter having n double cascades electrically connected in series, each of said double cascades having a capacitive energy store with a terminal and two switching devices including said turnoff power semiconductors connected electrically in parallel with said capacitive energy store;

each phase of said at least one phase of said output-side power converter having n four-quadrant controllers with AC voltage terminals and DC voltage terminals; and said booster transformer having n two-winding transformers per each phase of said at least one phase, a secondary side and a primary side, said two-winding transformers connected electrically in series on said secondary side and coupled in each case on said primary side to said AC voltage terminals of said four-quadrant controllers, and said DC voltage terminals of each of said four-quadrant controllers connected to said terminal of said capacitive energy store of a corresponding one of said double cascades.

2. The transformer according to claim 1, wherein each of said four-quadrant controllers have capacitors, and said capacitors of each of said four-quadrant controllers and said capacitive energy store of said corresponding one of said double cascades form a sub-assembly.

3. The transformer according to claim 1, wherein said n two-winding transformers of each phase of said at least one phase of said booster transformer are combined to form a transformer unit.

4. The transformer according to claim 3, wherein said transformer unit is a three-winding transformer having a five-limb core.

5. The transformer according to claim 1, wherein said switching devices are two-point modules.

6. The transformer according to claim 1, wherein said switching devices are three-point modules.

7. The transformer according to claim 1, wherein said switching devices are n-point modules.

8. The transformer according to claim 1, wherein said capacitive energy store has at least one capacitor and said switching devices have points, and a number said points determining a number of said at least one capacitor.

* * * * *